United States Patent
Radu et al.

(10) Patent No.: US 10,902,423 B2
(45) Date of Patent: Jan. 26, 2021

(54) METHOD AND APPARATUS FOR STREAMLINED DIGITAL WALLET TRANSACTIONS

(71) Applicant: MasterCard International Incorporated, Purchase, NY (US)

(72) Inventors: Cristian Radu, Beauvechain (BE); Jonathan James Main, Hampshire (GB); Eric G. Alger, Edwardsville, IL (US)

(73) Assignee: Mastercard International Incorporated, Purchase, NY (US)

( * ) Notice: Subject to any disclaimer, the term of this patent is extended or adjusted under 35 U.S.C. 154(b) by 468 days.

(21) Appl. No.: 14/621,123

(22) Filed: Feb. 12, 2015

(65) Prior Publication Data

US 2016/0092878 A1   Mar. 31, 2016

Related U.S. Application Data

(60) Provisional application No. 62/056,858, filed on Sep. 29, 2014.

(51) Int. Cl.
  *G06K 5/00* (2006.01)
  *G06Q 20/40* (2012.01)
  *G06Q 20/36* (2012.01)

(52) U.S. Cl.
  CPC ......... *G06Q 20/4014* (2013.01); *G06Q 20/36* (2013.01); *G06Q 20/4012* (2013.01)

(58) Field of Classification Search
  CPC .................. G06Q 20/341; G06Q 20/342
  USPC ......................................... 235/380, 382, 383
  See application file for complete search history.

(56) References Cited

U.S. PATENT DOCUMENTS

| | | | |
|---|---|---|---|
| 6,404,337 B1 * | 6/2002 | Van Till | A47G 29/141 340/568.1 |
| 7,899,748 B2 | 3/2011 | Peters | |
| 8,165,961 B1 * | 4/2012 | DiMartino | G06Q 20/105 705/41 |
| 2002/0164031 A1 * | 11/2002 | Piikivi | G06Q 20/12 380/270 |

(Continued)

FOREIGN PATENT DOCUMENTS

| | | |
|---|---|---|
| CN | 102917357 A | 2/2013 |
| WO | 02/071354 A2 | 9/2002 |

OTHER PUBLICATIONS

"PCT Notification of Transmittal of the International Search Report and the Written Opinion of the International Searching Authority, or the Declaration", dated Dec. 11, 2015, for International Application No. PCT/US2015/051456, 10pgs.

(Continued)

*Primary Examiner* — Daniel St Cyr
(74) *Attorney, Agent, or Firm* — Buckley, Maschoff & Talwalkar LLC

(57) ABSTRACT

A method includes maintaining a digital wallet in a computer, and receiving a request for a transaction. The computer may receive and verify user authentication data, and then allow the user to access any payment card account in the digital wallet without requiring additional user authentication, regardless of the account selected for the transaction by the user. In some embodiments, cryptogram generation may be performed with an EMV server in association with the digital wallet, to enhance the level of security assurance for merchants, issuers and users.

13 Claims, 9 Drawing Sheets

(56) References Cited

U.S. PATENT DOCUMENTS

| | | | |
|---|---|---|---|
| 2010/0325427 A1 | 12/2010 | Ekberg et al. | |
| 2012/0011063 A1 | 1/2012 | Killian et al. | |
| 2012/0296741 A1 | 11/2012 | Dykes | |
| 2013/0035970 A1 | 2/2013 | Fisher | |
| 2013/0054454 A1 | 2/2013 | Purves et al. | |
| 2013/0185552 A1 | 7/2013 | Steer | |
| 2013/0304648 A1 | 11/2013 | O'Connell et al. | |
| 2014/0012751 A1 | 1/2014 | Kuhn et al. | |
| 2014/0074655 A1 | 3/2014 | Lim et al. | |
| 2014/0108241 A1 | 4/2014 | Tunnell et al. | |
| 2014/0114857 A1* | 4/2014 | Griggs | G06Q 20/20 705/44 |
| 2015/0066691 A1* | 3/2015 | Ready | G06Q 30/0633 705/26.8 |
| 2015/0082407 A1* | 3/2015 | Galpin | H04L 63/10 726/9 |
| 2015/0088674 A1* | 3/2015 | Flurscheim | G06Q 20/3276 705/17 |
| 2015/0254655 A1* | 9/2015 | Bondesen | G06Q 20/3821 705/72 |

OTHER PUBLICATIONS

"PCT International Report on Patentability", dated Apr. 13, 2017, for International Application No. PCT/US2015/051456, 8 pp.

"Singapore Written Opinion", dated Sep. 6, 2017, International Property Office of Singapore (IPOS), for Singapore Application No. 11201702352X, 5pgs.

"Australian Examination Report No. 1", dated Nov. 10, 2017, Australian Government IP Australia, for Australian pplication No. 2015324337, 4pgs.

"Second Singapore Written Opinion", dated Apr. 9, 2018, International Property Office of Singapore (IPOS), for Singapore Application No. 11201702352X, 5pgs.

"Examination Report No. 2 for standard patent application", dated Apr. 30, 2018, Australian Government IP Australia, for Australian Application No. 2015324337, 6pgs.

"Communication: Extended European Search Report", dated Feb. 16, 2018 (Feb. 16, 2018), European Patent Office, for European Application No. 15846873.6, 8pgs.

"Examination Report No. 3 for standard patent application", dated Jul. 5, 2018, Australian Government IP Australia, for Australian Application No. 2015324337, 4pgs.

Singapore Written Opinion dated Jul. 10, 2019 which was issued in connection with SG11201702352X which was filed on Sep. 29, 2014.

Australian Search Report dated Apr. 30, 2018 which was issued in connection with AU 2018260922 which was filed on Sep. 22, 2015.

"Chinese Office Action", dated Apr. 28, 2020, China National Intellectual Property Administration, for Chinese Application No. 20158006339.X, 11 pgs.

"English-language Translation of Chinese Office Action", dated Apr. 28, 2020, China National Intellectual Property Administration, for Chinese Application No. 20158006339.X, 19pgs.

"Examination Report No. 1 for standard patent application", dated Oct. 25, 2019, Australian Government IP Australia, for Australian Application No. 2018260922, 5pgs.

"Communication pursuant to Article 94(3) EPC", European Patent Office, European Application No. 15846873.6 dated Oct. 22, 2019, 7 pp.

* cited by examiner

METHOD AND APPARATUS FOR STREAMLINED DIGITAL WALLET TRANSACTIONS

CROSS REFERENCE TO RELATED APPLICATION

This application claims the benefit of U.S. Provisional Patent Application No. 62/056,858 filed on Sep. 29, 2014, the contents of which are hereby incorporated by reference for all purposes.

BACKGROUND

Payment card accounts such as credit card accounts and debit card accounts are in widespread use. In one conventional manner of accessing a payment card account, the account holder presents a plastic card at the point of sale in a retail store. The point of sale device reads account information from the card (e.g., via a magnetic stripe or through wireless communication with an integrated circuit in the card, or via electrical contacts on the card) and initiates a payment card account transaction using the information read from the card.

Payment card accounts are also widely used in e-commerce. For example, an account holder may use a personal computer or a smartphone to access a merchant's online store webpage. After selecting goods for purchase and then opting for "check out", the account holder is prompted to enter his/her payment card account information into a data entry screen downloaded to his/her computer (or smartphone). The merchant's e-commerce host computer then initiates a payment card account transaction using the information that was entered by the account holder.

Given that many users of payment card accounts may have more than one such account, there have been proposals for so-called digital wallets. According to one type of proposed arrangement, a wallet service provider (WSP) maintains digital wallets for a large number of users. Each user causes some or all of his/her payment card accounts to be enrolled in his/her digital wallet, and the WSP stores the corresponding information in a data partition that is dedicated to the respective user and thus forms his/her digital wallet. When the user seeks to check out at the conclusion of an e-commerce shopping transaction, the user is given the option to access his/her wallet at the wallet service provider. Via data communication among the user's computer/smartphone, the merchant's e-commerce host computer and the WSP's computer, the user is presented with an option to select one of his/her enrolled payment card accounts for use in the current e-commerce transaction. This may require very little effort on the part of the user. Once the user selects the desired payment account from his/her digital wallet, the merchant is enabled to use the corresponding account information to initiate a payment card account transaction using the account selected by the user. This type of arrangement may offer great convenience to the user/online shopper, because he/she is freed from entering the payment card account information details as part of the e-commerce transaction. At the same time, the user has the option of selecting among various payment card accounts, and is not required to entrust his/her payment card account information for storage on the merchant's e-commerce computer.

Another type of proposal for a digital wallet is based on payment-enabled smartphones or similar mobile devices. Instead of storing just one set of payment card account credentials in a payment-enabled smartphone, the user may be allowed to enter the information for several different payment card accounts into the payment-enabled smartphone. The smartphone runs a wallet application, which manages the user's access to the payment card account information stored in the smartphone. The account information corresponding to the wallet function in the smartphone may be stored in a so-called "secure element" (SE) within the smartphone. At the point of sale, the user interacts with the smartphone wallet application via the smartphone user interface to select one of the payment card accounts for which information was stored in the smartphone. The smartphone then wirelessly transmits the information for the selected payment card account to the point of sale terminal via NFC (Near Field Communication) or other standard communication protocol. For example, the smartphone may run a payment card account app (application program) that emulates an IC payment card in its interaction with the point of sale terminal. The point of sale terminal, in turn, initiates a payment card account transaction based on the payment card account information it received from the smartphone.

There have also been proposals to emulate the SE functions of a smartphone remotely, thereby potentially reducing the hardware cost and complexity for a smartphone that provides digital wallet functionality. The SE is under the control of a Mobile Network Operator (MNO), therefore rendering the WSP hosting the card or the card's issuer dependent on the MNO. In a sense, this may blur the distinction suggested above between web-based and mobile-device-based digital wallets.

One issue that could be faced in digital wallet functions accessed via a mobile device—or by a PC (personal computer) or other user device that runs a browser and is used for a remote payment transaction—is the user experience in regard to authentication of the transaction. Depending on the nature of the wallet account to be accessed, a given transaction may require the user to enter two sets of cardholder verification data (e.g., one for wallet/device access, and the other required for use of a particular account). (As used in the previous sentence, the term cardholder verification data may refer to something the user "knows" (such as a PIN—personal identification number), or data derived from "what the user is" (i.e., biometric data such as a fingerprint scan or a facial recognition scan).) Moreover, the number of cardholder verification inputs required and/or which specific cardholder verification is required may vary from transaction to transaction depending on the particular payment account selected for the transaction by the user. The result could be confusion and inconvenience for the user.

Further, the present inventors have recognized the desirability of extending proposals concerning mobile-based access to digital wallets and the triggering of cryptographically secured remote payments so as also to be applicable to wallet access using non-mobile devices such as PCs.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a WSP may provide enhanced services in connection with payment transactions. For a given individual user, the WSP may provide a partition that includes both conventional web-based card-on-file wallet services and also provides remote emulation of payment apps for one or more card accounts in lieu of storage of apps/accounts on the user's mobile device. The wallet server may be programmed to allow the user to access all accounts in the wallet, both conventional and remote-app-emulation, via a single, uniform device and user authentication procedure. More generally, for remote wallet access via either mobile devices or other devices (e.g., via PCs running web browsers), the WSP may manage user authentication and may provide or obtain services for transaction-signing/ generation of required cryptograms in a manner that streamlines user access to wallet services and wallet-based accounts.

Figure 1:
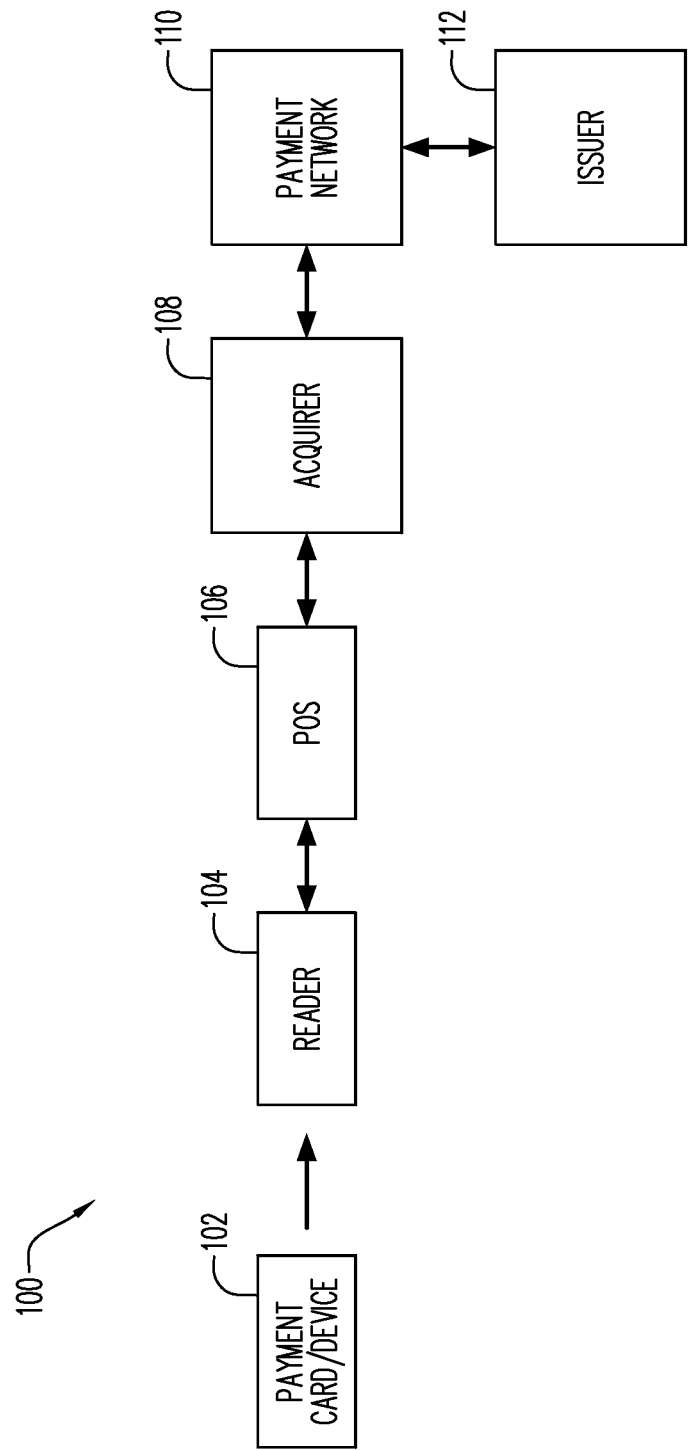
FIG. 1 is a block diagram that illustrates a conventional payment system.

By way of background, a conventional payment system will first be briefly described. FIG. 1 is a block diagram that illustrates a conventional payment system 100.

The system 100 includes a conventional payment card/ device 102. As is familiar to those who are skilled in the art, the payment card/device 102 may be a magnetic stripe card, an IC (integrated circuit) card, a fob, a payment-enabled smartphone, etc.

The system 100 further includes a reader component 104 associated with a POS terminal 106. In some known manner (depending on the type of the payment card/device 102) the reader component 104 is capable of reading the payment card account number and other information from the payment card/device 102.

The reader component 104 and the POS terminal 106 may be located at the premises of a retail store and operated by a sales associate of the retailer for the purpose of processing retail transactions. The payment card/device 102 is shown in FIG. 1 to be interacting with the reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is associated with the payment card/device 102. As is also well known, the authorization response generated by the payment card issuer server computer 112 may be routed back to the POS terminal 106 via the payment network 110 and the acquirer computer 108.

One well known example of a payment network is referred to as the "Banknet" system, and is operated by MasterCard International Incorporated, which is the assignee hereof.

The payment card issuer server computer 112 may be operated by or on behalf of a financial institution ("FI") that issues payment card accounts to individual users. For example, the payment card issuer server computer 112 may perform such functions as (a) receiving and responding to requests for authorization of payment card account transactions to be charged to payment card accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment cards or other devices for initiating payment transactions by presenting an associated payment card account number to the reader component of a POS terminal.

Figure 2:
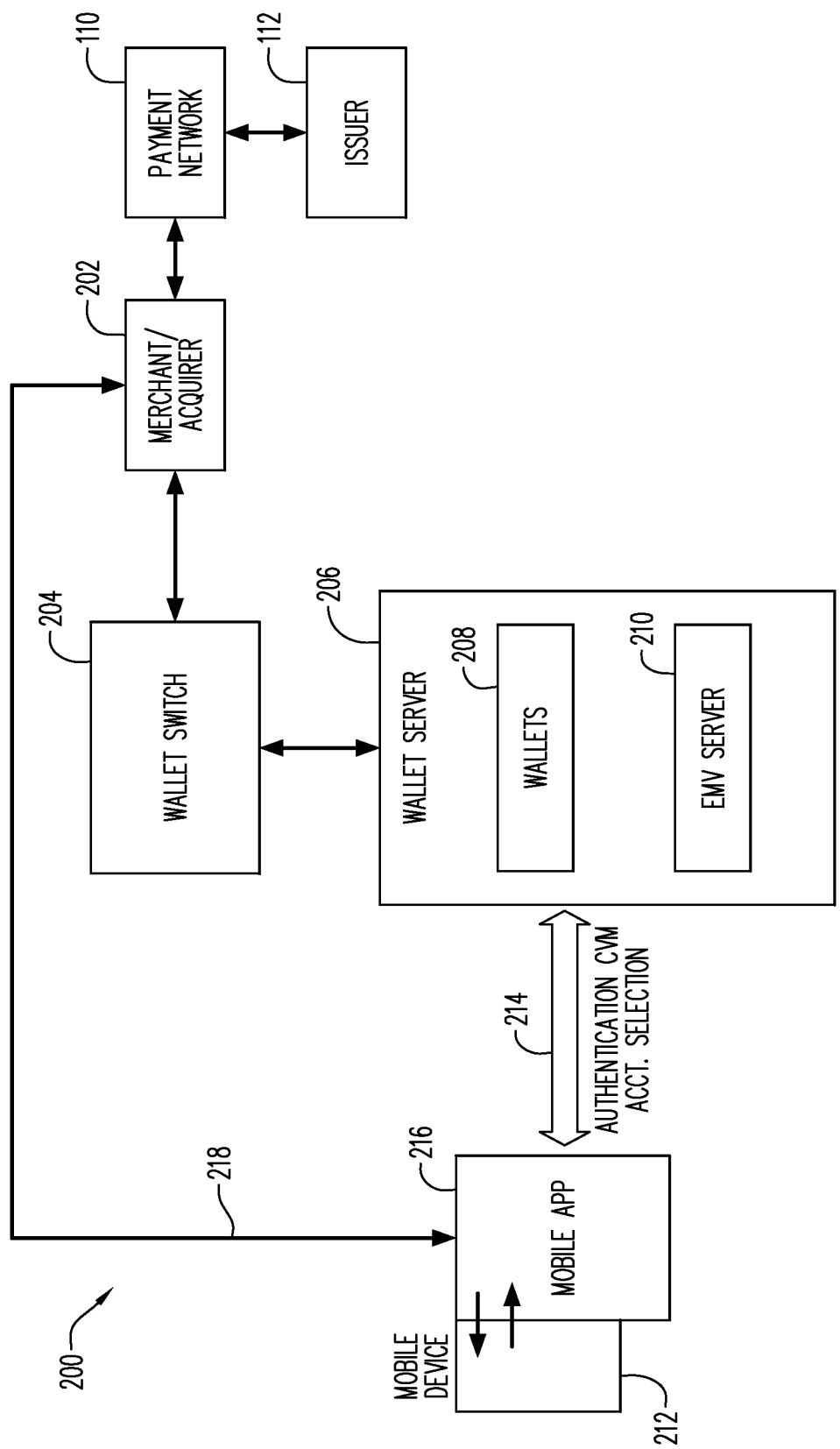
FIG. 2 is a block diagram that illustrates a payment system provided in accordance with aspects of the present invention.

FIG. 2 is a block diagram that illustrates a payment system 200 provided in accordance with aspects of the present invention. (As was the case in FIG. 1, the payment system is depicted in FIG. 2 only in terms of components needed for a single transaction; in practice, and as will be discussed below, the payment system 200 may include many more instances of at least some components.)

Like FIG. 1, FIG. 2 shows a payment network 110 and a server computer 112 as referred to above. In some embodiments, these two system components may operate substantially in a conventional manner to receive and route payment card account system transaction authorization requests and transaction authorization responses.

For simplicity of illustration, the merchant and acquirer aspects of the payment system 200 are represented by a single block 202. The merchant/acquirer block 202 (i.e., either a device operated by the merchant, or by the acquirer, or by a service provider for one or the other) is shown as being in communication with a wallet switch 204. The wallet switch 204 may receive a communication from the merchant/acquirer block 202 when a customer indicates to the merchant that the customer wishes to access a WSP to provide payment for a transaction. In effect, the wallet switch 204 may bring a wallet server 206 into the transaction by relaying, to the wallet server 206, transaction details that originate from the merchant. Details of the wallet server 206 will be described below. Significant aspects of the wallet server 206 include its storage of digital wallets 208 for numerous users of the payment system 200, and its running of numerous instantiations 210 of a payment card application emulation program. In some embodiments, for example, the emulation programs 210 may operate in accordance with the well-known EMV standard for payment card transactions, which has been set forth by EMVCo, LLC, and which is in widespread use. Accordingly, in addition to functioning as a wallet server, component 202 may also function as an EMV server.

In addition, or alternatively, the wallet server 206 may incorporate additional transaction security functionality, which is not explicitly shown in the drawing. For example, the wallet server 206 may include, or may trigger access to, the functionality of a so-called Access Control Server (ACS) as provided in accordance with a 3DS (three domain security) payment scheme. (The ACS and 3DS concepts are familiar to those who are skilled in the art, and are discussed, for example, in U.S. published patent application no. 20080154770, which is commonly assigned herewith.)

Authentication for transactions may occur via a procedure carried out between the wallet server 206 and a user/payment device (reference numeral 212) operated by a user who is engaging in a purchase transaction with the merchant. In FIG. 2, the user/payment device 212 is depicted as a mobile device such as a smartphone, but in other situations, for example, the user/payment device 212 may be a PC or the like that is being used, via its browser program, to access an e-commerce site for the present transaction. For the particular example transaction illustrated in FIG. 2, the user/payment device 212 is shown as engaging in an interaction 214 with the wallet server 212 via a mobile authentication app (application program) 216.

The interaction 214 between the wallet server 206 and the user/payment device 212 may include authentication as well as selection of an account from the user's digital wallet stored in the wallet server 206. Authentication may include device authentication and user authentication. The latter may also be referred to as performance of a CVM (cardholder verification method).

As schematically illustrated by connection 218 in FIG. 2, the mobile app 216 may effectively indicate to the merchant/acquirer 202 that the payment phase for an online shopping "basket" may be completed, where the basket total is known to the user; the mobile app 216 may also indicate that the user has selected a particular wallet brand as the preferred payment method for the current transaction.

It is worth noting that for each component shown in FIG. 2, the actual number of such components included in a practical embodiment of the system 200 may be greater than one. For example, there may be numerous merchants who participate in the system, as well as an even larger number of individuals operating mobile devices that are programmed for transaction authentication or other user/payment devices. There may also be a considerable number of acquirers and issuers, and perhaps a number of wallet servers and potentially more than one payment network. As will be understood from the above description of the conventional payment system 100, the payment system 200 shown in FIG. 2 may process many transactions, including simultaneous transactions.

In a typical configuration of the payment system 200, the wallet server 206 is remote from both the merchant and from the user/payment device 212.

Figure 3:
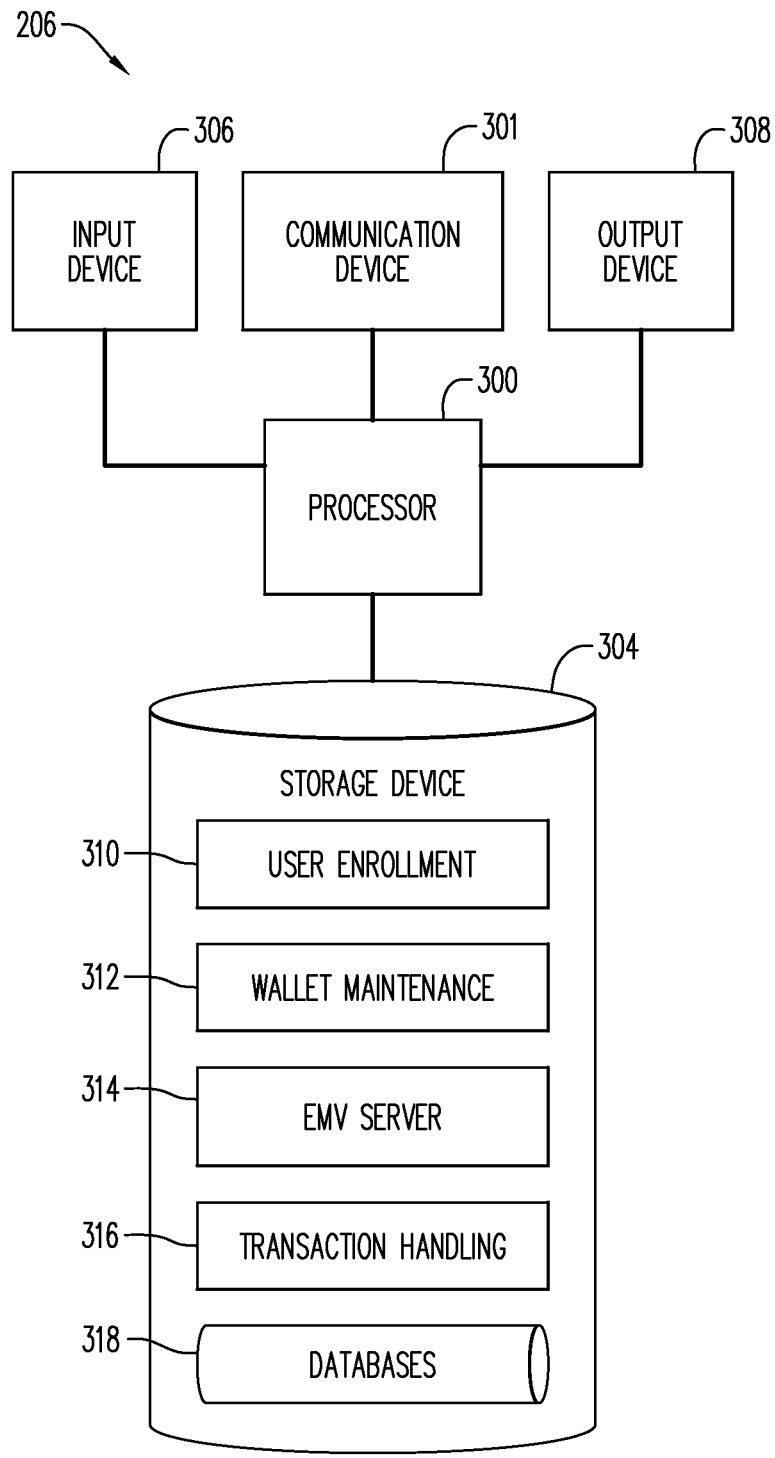
FIG. 3 is a block diagram that illustrates a computer system that may be provided as part of the system of FIG. 2 and in accordance with aspects of the present invention.

FIG. 3 is a block diagram that illustrates an example embodiment of the wallet server 206 as shown in FIG. 2 and provided in accordance with aspects of the present invention.

Referring now to FIG. 3, the wallet server 206 may be conventional in its hardware aspects but may be controlled by software to cause it to function as described herein. For example, the wallet server 206 may be constituted by conventional server computer hardware.

The wallet server 206 may include a computer processor 300 operatively coupled to a communication device 301, a storage device 304, an input device 306 and an output device 308.

The computer processor 300 may be constituted by one or more conventional processors. Processor 300 operates to execute processor-executable steps, contained in program instructions described below, so as to control the wallet server 206 to provide desired functionality.

Communication device 301 may be used to facilitate communication with, for example, other devices (such as the wallet switch 204, and the user/payment device 212). For example, the communication device 301 may include numerous communication ports and interfaces to facilitate communications over-the-air via one or more mobile communication networks (not shown) with mobile devices operated as user/payment devices by numerous users of the payment system 200 (and/or the communication device 301 may facilitate numerous calls for service via the Internet by user/payment devices).

Input device 306 may comprise one or more of any type of peripheral device typically used to input data into a computer. For example, the input device 306 may include a keyboard and a mouse. Output device 308 may comprise, for example, a display and/or a printer.

Storage device 304 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 304 stores one or more programs for controlling processor 300. The programs comprise program instructions (which may be referred to as computer readable program code means) that contain processor-executable process steps of the wallet server 206, executed by the processor 300 to cause the wallet server 206 to function as described herein.

The programs may include one or more conventional operating systems (not shown) that control the processor 300 so as to manage and coordinate activities and sharing of resources in the wallet server 206, and to serve as a host for application programs (described below) that run on the wallet server 206.

The programs stored by the storage device 304 may include, for example, a user enrollment application program 310. The user enrollment application program 310 may control the processor 300 to enable the wallet server 206 to handle requests from users to enroll for wallet services provided by the wallet server 206. For example, this may include, at least in part, opening a user account on the wallet server 206 and enrolling a number of the user's payment card accounts for inclusion in the digital wallet to be provided for the user on the wallet server 206. Enrollment of the user's payment card accounts may, in at least some cases, be via the PAN (primary account number) that identifies the payment card account in question and/or may be via a payment token of the type referred to in the "Payment Token Interoperability Standard" published in November 2013 by MasterCard International Incorporated, Visa and American Express.

The user's interaction with the wallet server 206 to establish the user's digital wallet may, for example, be via access to a website hosted by the wallet server 206.

The storage device 304 may also store a wallet maintenance application program 312 that controls the processor 300 to enable the wallet server 206 to store and maintain the digital wallets that have been established by users in the wallet server 206.

In addition, the storage device 304 may store program instructions 314 such as are required to allow the wallet server 206 to operate as an EMV server (and/or to emulate other payment card account applications in addition to or instead of EMV applications). The program instructions 314 may enable to the wallet server 206 to run numerous instantiations of an EMV app, such that the wallet server 206 can emulate a card digitization for each payment card account for each user, to the extent that the payment card accounts are required to be processed in conformance with the EMV standard. In some embodiments, the wallet server 206 may run at least a thousand, or many thousands, of instantiations of an EMV app. As noted above, the wallet server 206 may additionally or alternatively provide other payment security functionality, such as ACS functionality; the storage device 304 accordingly may also store software (not shown) to implement such functionality.

The storage device 304 may also store a payment transaction handling program 316, which controls the processor 300 to enable the wallet server 206 to handle device and user authentication and wallet account selection for numerous transactions referred to the wallet server 206 from the wallet switch 204. Details of transaction handling by the wallet server 206 will be described below, particularly with reference to FIG. 5.

The storage device 304 may also store, and the wallet server 206 may also execute, other programs, which are not shown. For example, such programs may include a reporting application, which may respond to requests from system administrators for reports on the activities performed by the wallet server 206. The other programs may also include, e.g., one or more data communication programs, website hosting programs, a database management program, device drivers, etc.

The storage device 304 may also store one or more databases 318 required for operation of the wallet server 206. Such databases may include, for example, a database (not separately indicated in FIG. 3) for storing data corresponding to digital wallets and associated digital cards maintained for users/cardholders in the wallet server 206.

As noted above, a number of different types of devices, including smartphones, PCs, laptop computers, tablet computers, etc. with Internet connections may be employed as user/payment devices for wallet-based payment transactions. Given that in many instances a mobile device such as a smartphone may be employed in that role, it is worthwhile to illustrate aspects of such a device, as is done in the accompanying FIG. 4.

Figure 4:
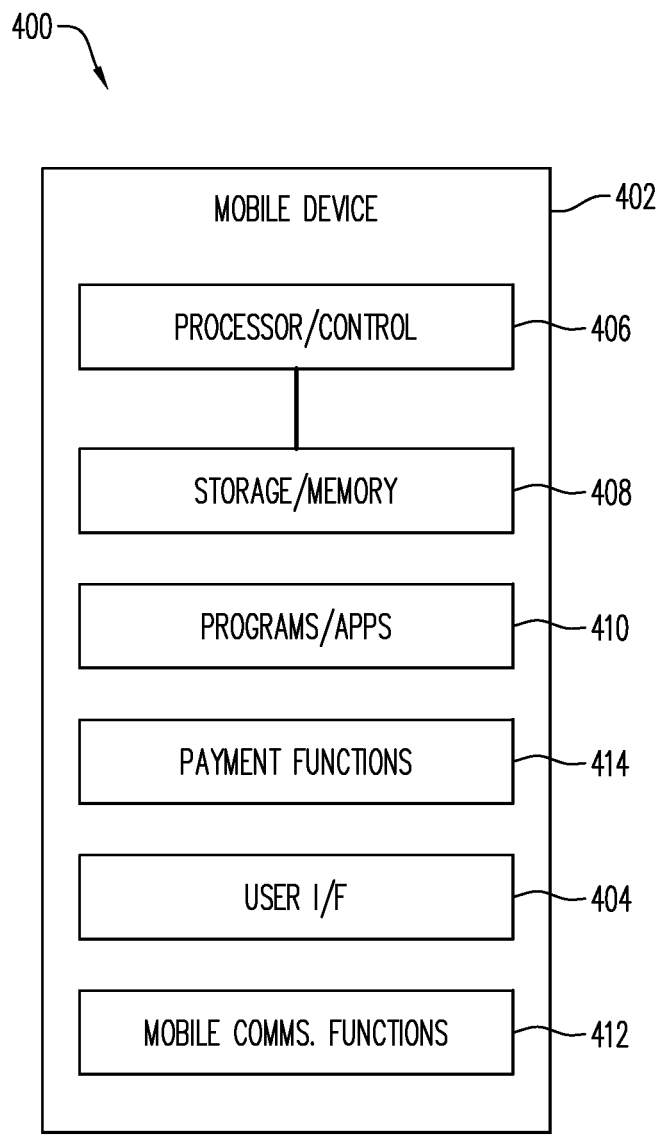
FIG. 4 is a block diagram of a mobile device that may be used in connection with payment transactions in the system of FIG. 2.

FIG. 4 is a block diagram of an embodiment of a mobile device (assigned reference numeral 400 for purposes of this drawing) that may be used in connection with payment transactions in the payment system 200 of FIG. 2.

In one example embodiment, the mobile device 400 may be a typical smartphone, and thus may be entirely conventional in its hardware aspects and also in most software aspects, except that the mobile device 400 may be programmed suitably to allow it to interact with, e.g., a merchant device and with the wallet server 206 as described herein. In brief, the mobile device 400 may identify itself to a merchant device, and may engage in operations relative to the wallet server 206 such as device authentication, user authentication, receipt of wallet data and selection from among wallet accounts. Details of these operations will be provided below in connection with FIG. 5. In any event, a brief overview of the largely conventional salient aspects of the mobile device 400 will now be provided.

The mobile device 400 may include a conventional housing 402. In many embodiments, the front of the housing is predominantly constituted by a touchscreen, which is a key element of the user interface 404 of the mobile device 400.

The mobile device 400 further includes a conventional mobile processor/control circuit 406, which is contained within the housing. Also included in the mobile device 400 is a storage/memory device or devices (reference numeral 408). The storage/memory devices are in communication with the processor/control circuit 406 and may contain program instructions to control the processor/control circuit to manage and perform various functions of the mobile device 400. As is well-known, such functions include operation as a mobile voice communication device via interaction with a mobile telephone network (not shown). Further conventional functions include operation as a mobile data communication device, and also as what is in effect a pocket-sized personal computer, via programming with a number of application programs, or "apps". (The apps are represented at block 410 in FIG. 4, and may in practice be stored in block 408, to program the processor/control circuit 406 in myriad ways.) The above-referenced mobile communications functions are represented by block 412, and in addition to programmed control functions, the mobile communications functions also rely on hardware features (not separately shown) such as an antenna, a transceiver circuit, a microphone, a loudspeaker, etc.

Block 414 in FIG. 4 represents features that enable the mobile device 400 to participate in the payment system 200 in ways that are described herein. This may involve one or more of the apps 410 that may, for example, program the processor to engage in authentication procedures in interaction with the wallet server 206, and may also implement what is in effect a "thin wallet" function that essentially relies on wallet services available through the wallet server 206.

In other words, the apps 410 may include an authentication app (not separately indicated in FIG. 4), which may engage in communications with the wallet server 206 to accomplish authentication functions as described below in connection with FIG. 5.

From the foregoing discussion, it will be appreciated that the blocks depicted in FIG. 4 as components of the mobile device 400 may in effect overlap with each other, and/or there may be functional connections among the blocks which are not explicitly shown in the drawing.

It has been posited that the mobile device 400 may be embodied as a smartphone, but this assumption is not intended to be limiting, as the mobile device 400 may alternatively, in at least some cases, be constituted by a tablet computer that has mobile communication capabilities or by other types of mobile computing devices. Other types of computing device, as noted above, may also be utilized as user/payment devices in accordance with aspects of the present invention.

Figure 5:
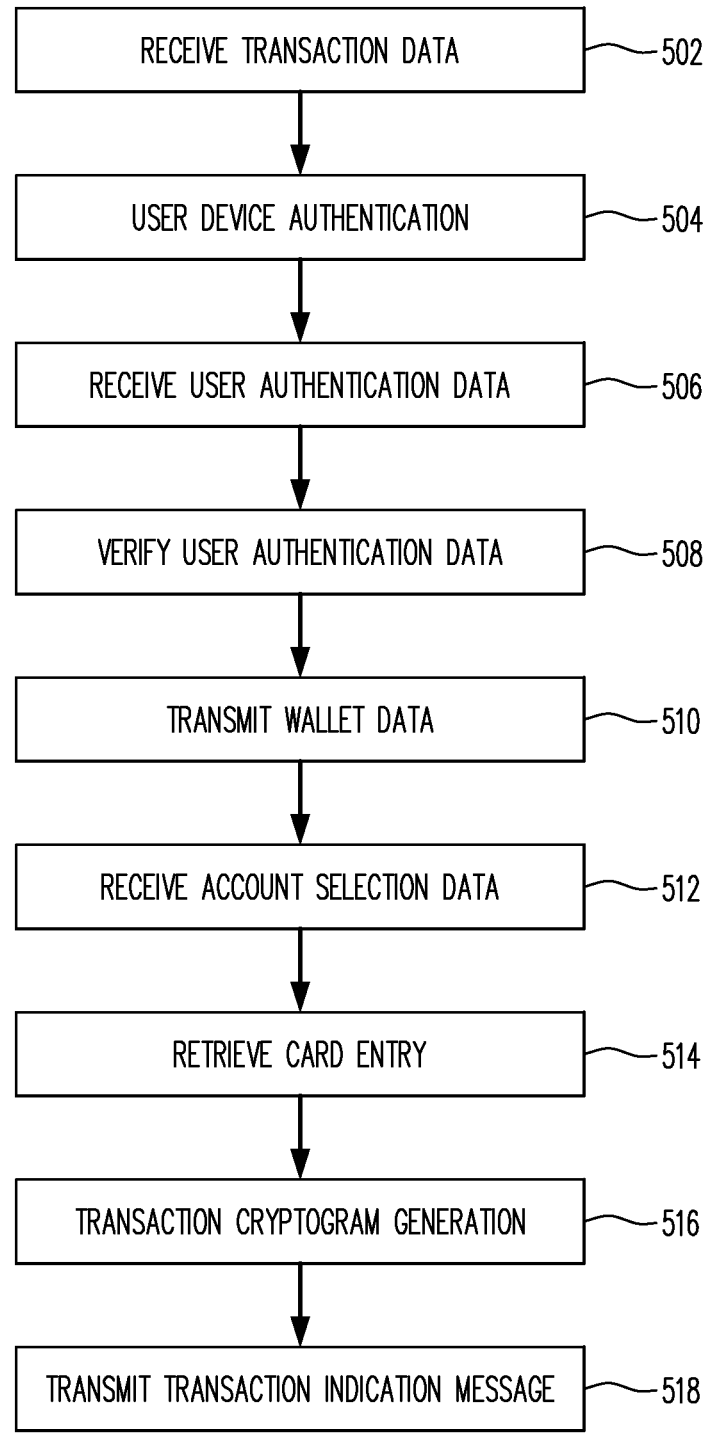
FIG. 5 is a flow chart that illustrates a process that may be performed in the system of FIG. 2 in accordance with aspects of the present invention.

FIG. 5 is a flow chart that illustrates a process that may be performed in the payment system 200 in accordance with aspects of the present invention. Each process block explicitly shown in FIG. 5 may be performed in or by the wallet server 206. However, these process blocks are in general related to actions taken by at least some other components of the payment system 200. The actions of the other system components related to a typical transaction therefore will also be described briefly and as required to provide context for the actions of the wallet server 206.

A typical transaction may begin with an interaction between a user/customer and the merchant. For example, the user may select merchandise and indicate to the merchant that the user wishes to purchase the merchandise. This may occur, for example, in a brick-and-mortar retail store or as part of an online purchase transaction. In some cases, there may be communication between the user/payment device 212 and the merchant to identify the user/payment device 212. For example, the identification of the user/payment may be by mobile phone number or by the user's mobile wallet account number—which may or may not be one and the same. In some embodiments, the user may input his/her mobile phone number or other wallet account identifier into a merchant device. The latter may be, for example, a suitably equipped and programmed POS device or an e-commerce server computer that hosts an online shopping website. In other instances, the user/payment device may identify itself to the merchant via a suitable "cookie" that has previously been installed on the user/payment device to aid in using the device in payment/e-commerce transactions.

The merchant may generate transaction details, such as date, transaction amount, merchant identifier, merchant device identifier, user mobile device identifier, etc. The merchant or the merchant's acquirer may transmit data representing the transaction details to the wallet switch 204 so as to invoke wallet services for the transaction.

The wallet switch 204 may forward the transmission of transaction detail data to the wallet server 206. The wallet server 206 may receive the transmission of transaction detail data, as indicated at block 502 in FIG. 5.

Block 504 follows block 502 in FIG. 5. At block 504, the wallet server 206 engages in communication with the user/payment device 212 in order to effect a device authentication procedure for the user/payment device 212.

There are various types of device authentication procedures that may be used, and the type of device authentication procedure may vary depending on the type of device that is being used as the user/payment device 212. For example, where the user/payment device is a mobile device, a so-called "mobile device fingerprint" may be used. For example, in some embodiments, the mobile OS (operating system) may function so as to allow a mobile app to ask the mobile OS to indicate a unique device identifier that is in effect permanently associated with the mobile device. In some embodiments, the mobile OS may calculate a hash result over one or more serial numbers of hardware component(s) of the device and over serial numbers of software drivers running on the device to arrive at the mobile device fingerprint.

In the case where a PC or laptop computer or the like is used as the user/payment device 212, device authentication may rely on so-called "security cookies". For example, when a user registers with the wallet server 206 using the user/payment device 206, the wallet server 206 may generate a fixed cryptogram and download it to the user/payment device 212 in the form of a cookie that will serve as a device fingerprint.

In addition, or as part of the device authentication procedure, a user authentication procedure may also be performed. Thus, as represented at block 506, the wallet server 206 may receive user authentication data from the user/payment device 212. Alternatively, the user/payment device 212 may calculate a hash or other cryptographic result over both a device fingerprint and user authentication data provided by the user, and may transmit the result to the wallet server 206 in a combined device and user authentication. With both device and user authentication occurring, the payment system 200 may be operating on the basis of "two-factor" security.

In some embodiments, and/or for some users, the user authentication data may include a PIN that was entered by the user into the user/payment device 212 (upon prompting to the user from the user/payment device 212). In other embodiments, and/or for some users, the user authentication data may include biometric data gathered from the user by the user/payment device 212 (again upon prompting from the user/payment device 212). For example, the biometric data may be from a voice utterance by the user into the microphone of the user/payment device 212 to generate voice recognition biometric data. As another alternative, the user/payment device 212 may execute a fingerprint read with respect to the user. As still another possibility, the user/payment device (if equipped with a camera) may capture an image of the user's face to generate facial recognition biometric data. In any of these examples, or for other types of biometric data gathering, the user/payment device 212 may transmit raw and/or processed/summarized biometric data to the wallet server 206 and/or may transmit a hash calculated over PIN/password/biometric parameters and/or a device fingerprint.

The user authentication (block 506) may occur simultaneously with, or close in time (e.g., within one minute) relative to the device authentication (block 504).

In some embodiments, neither the PIN nor the biometric data (as the case may be) is stored in the user/payment device 212 after user authentication is complete.

At block 508 in FIG. 5, the wallet server 206 may verify the user authentication data that it received from the user/payment device 212. For example, if the user authentication data was a PIN, as entered into the user/payment device 212 by the user, then the wallet server 206 may verify that the PIN as received from the user/payment device 212 matches the PIN stored in the wallet partition stored for the user's account in the wallet server 206. In cases where the user authentication data was biometric data, the wallet server 206 may analyze the biometric data and/or verify the biometric data against biometric reference data stored for the user in the wallet partition for the user's account.

In some embodiments, it may be desirable to provide enhanced security by utilizing device and/or user authentication procedures such that the device and/or user authentication data is transformed mathematically by the user/payment device 212 before being transmitted to the wallet server 206. That is, the user/payment device may transmit to the wallet server 206 a result of a mathematical transformation that is applied to the device fingerprint and/or the user authentication data, and for present purposes the transformation result as received by the wallet server 206 may be deemed either or both of the device authentication data and the user authentication data.

In some embodiments, the user/payment device 212 may implement two factor security based on (1) "something you have", such as a secured application, which cannot be tampered with, and which implements a cryptographically resistant one-way function; and (2) either (A) "something you know" (e.g., secret information such as a PIN) or (B) "something you are" (e.g., a biometric characteristic that can be detected by the user/payment device 212 and translated into a biometric data in a predetermined format).

A cryptographically resistant one-way function f may have the following features: (a) The description of f is publicly known; (b) Given the input x, it is easy to compute f(x), while for all images y in the range of f it is computationally unfeasible to derive an input x such that y=f(x) (this feature is sometimes called first pre-image resistance); (c) Even though there are arguments x≠x' for which f(x)=f(x'), given a pair (x, f(x)), it is computationally unfeasible to find x' such that f(x)=f(x') (this feature is sometimes called second pre-image resistance); (d) It must be computationally unfeasible to find any arguments x≠x' for which f(x)=f(x'), in which case the function is said to be collision resistant.

In some embodiments, an authentication process such as the following may take place, to possibly encompass blocks 504-508 of FIG. 5:

(A) The wallet server 206 may retrieve a stored authentication method for the user/user device involved in the transaction. That authentication method may be the function f to be used in the authentication process. At the same time, the wallet server 206 may retrieve the stored secret/biometric data for the user/user device.

(B) The wallet server 206 may generate a challenge (e.g., a random number) and compile session data.

(C) The wallet server 206 may demand of the user device that it provides an "authenticator" computed based on the function f for the current session data and based on the just-generated challenge.

(D) The user device uses the required function f and computes a result based on the user device's secret information/biometric data (as the case may be), and also based on the challenge and session data received from the wallet server 206.

(E) The user device sends the computed result (i.e., the authenticator) back to the wallet server 206.

(F) The wallet server 206 uses the function (f) to compute a result based on the secret information/biometric data retrieved for the user/user device and also based on the challenge and the session data.

(G) The wallet server 206 compares the result it calculated with the result it received from the user device. If the comparison indicates a match, then the user/user device is authenticated, and the wallet server 206 may proceed to allow the user to access his/her digital wallet maintained on the wallet server 206.

Assuming that both the authentication step(s) are successfully completed, then, as indicated at block 510 in FIG. 5, the wallet server 206 may retrieve from the user's wallet partition and then transmit—to the user/payment device 212—data that represents the payment card accounts that the user had enrolled in the user's digital wallet maintained in the wallet server 206. The data may be referred to as "wallet data", and may be sufficient to allow the user/payment device 212 to display to the user a menu of financial accounts that are available for the user to select for the current transaction. In some embodiments, the financial accounts may be payment card accounts, such as credit or debit card accounts and/or prepaid payment card accounts. In some embodiments, some of the user's accounts in the digital wallet may be stored in the digital wallet in a conventional manner that does not involve mobile wallet emulations/payment card account apps. In some embodiments, some of the user's accounts in the digital wallet may be stored so as to simulate a mobile-wallet-stored account and may be associated with payment card application emulation programs, such as instantiations of an EMV application (e.g., for accounts for which the issuers expect compliance with the EMV standard).

It will next be assumed that the user/payment device 212 does in fact display to the user the above-mentioned menu of payment card accounts available in the user's digital wallet, and that the user interacts with the user/payment device 212 to indicate selection of one of the accounts. Further, in response to the input from the user, the user/payment device 212 may generate account selection data, which indicates the account that was selected by the user. Then, the user/payment device 212 may transmit the account selection data to the wallet server 206.

Block 512 in FIG. 5 represents the wallet server 206 receiving the account selection data that was generated and transmitted by the user/payment device 212. In response, at block 514, the wallet server 206 may retrieve the card entry for the selected account from the wallet partition that it maintains for the user. This may involve retrieving account data related information that has been stored in the card entry in question. In at least some cases, the card entry may pertain to a digitized EMV payment card that has been provisioned to the user's wallet. In such a case, the retrieved card entry may effectively constitute a personalization profile that the wallet server 206 may employ in invoking its EMV server function 210 (FIG. 2) to emulate the digitized card. Accordingly, the wallet server 206 may call the EMV server function 210 to request an EMV cryptogram for the transaction. The call may include the transaction details that the wallet server 206 received for the transaction, and also an indication that a user authentication status flag has been set to a "valid" state. (One example of such a user authentication status flag may be the mPIN verification status flag (PVS flag), which may be handled in this context as an emulation of a PVS="1" condition that may be provided by a MasterCard mobile payment application at a point of sale.)

Continuing to refer to FIG. 5, and as indicated at block 516 therein, the EMV server function 210 may emulate an EMV mobile payment application with personalization data that has been stored in the EMV server function 210 during an initialization process, and may produce a cryptogram for the transaction, including an application cryptogram (AC) that includes an indication that mPIN verification was successful. Thus the emulation performed by the EMV server function produces a result as if the user had successfully entered a required card or device PIN. This setting of the user authentication status flag at the wallet server 206 is in contradistinction to conventional EMV processing practices, in which such a flag is set by the payment card (IC card) or other payment device at or prior to the point of sale. Thus the wallet server 206 may retrieve or generate all the data provided at the point of sale in connection with a conventional EMV transaction, including the PAN or payment token for the account selected by the user, a user authentication flag having a "valid" value, an application cryptogram (AC) in some cases, etc. Although for the sake of compliance with widely supported standards, an mPIN verification indication may be provided in the cryptogram, in fact the authentication of the user may have taken a different form (as noted above), such as verification of a cryptographic result based on secret information associated with the user's wallet, or based on biometric parameters.

As noted before, the wallet server 206 may additionally or alternatively incorporate or be in communication with other varieties of transaction security functionality. According to an example referred to above, the wallet server may include or access the functionality of an ACS, which may be an alternative source of a transaction cryptogram.

At 518, the wallet server 206 may transmit the transaction cryptogram to the merchant/acquirer 202 (FIG. 2), via the wallet switch 204. This indicates that the transaction was progressed successfully at the wallet server 206, and may allow for completion of the transaction via the merchant/acquirer 202 and on to the issuer 112 via the payment network 110. In view of the transaction cryptogram from the wallet server 206, the issuer 112 may treat the transaction as if it had been a mobile device payment transaction with valid pre-PIN entry, as currently implemented today by issuers that support mobile payments via existing payment networks. Assuming all is in order with the user's account, the issuer may return a favorable authorization response that is routed via the payment network 110 to the acquirer/issuer.

With a payment system 200 as described herein, and particularly with operation of a wallet server 206 as described herein, the user of a digital wallet may find that his/her user experience is uniform and predictable regardless of which financial account he/she selects for a transaction. Moreover, the user authentication process may also be uniform and predictable. For example, if PIN entry is the applicable user authentication method, the user may find that he/she is always required to enter just one PIN over any desired use he/she makes of digital wallet functions (from the wallet server 206) through his/her smartphone or other user/payment device, and the PIN to be entered would not change from transaction to transaction. Thus the payment system 200 as described herein may provide a streamlined and improved user experience. This may be accomplished, for example, by establishing a single "wallet PIN" for triggering a payment transaction with any card stored in the user's digital wallet, in place of a potential diverse group of specific PINs corresponding to particular card accounts.

Figure 6:
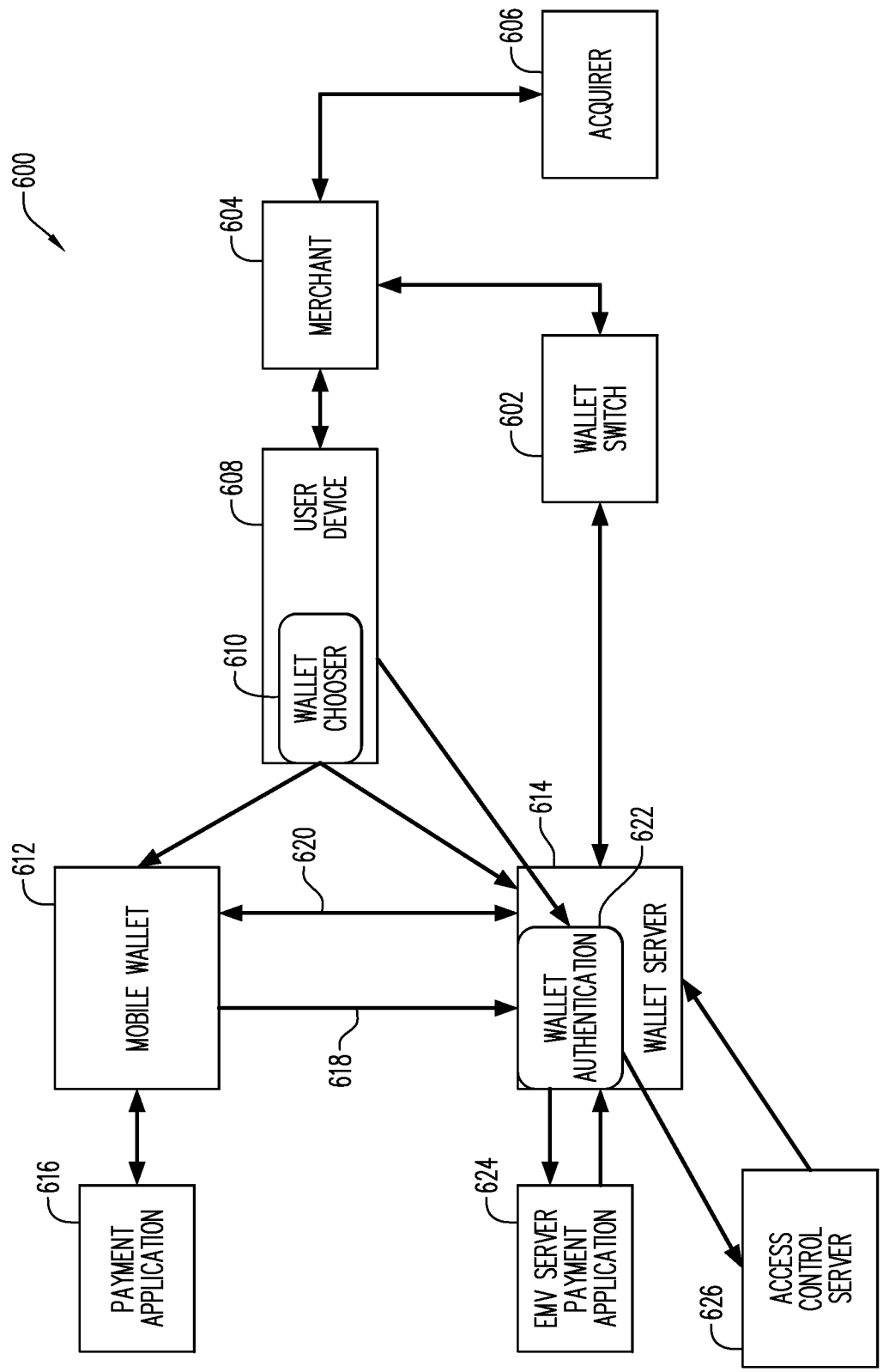
FIG. 6 is a block diagram that illustrates an alternative embodiment of a payment system provided in accordance with aspects of the present invention.

FIG. 6 is a block diagram that illustrates an alternative embodiment of a payment system provided in accordance with aspects of the present invention. The payment system illustrated in FIG. 6 is generally indicated by reference numeral 600.

As in payment system 200 of FIG. 2, in the payment system 600 a wallet switch 602 allows a merchant 604 to trigger payment processing for a transaction (remote or in-store). As in the conventional system shown in FIG. 1, the merchant 604 depicted in FIG. 6 has a banking relationship with an acquirer 606. It will be understood that a conventional payment network and issuer, though not shown in present drawing, are also components of the payment system. Moreover, as in the previous system diagrams, only system components required for a given transaction are shown; in a practical embodiment of the payment system at least some of the components of the types shown may be present in large numbers.

It should also be noted that, as suggested in connection with FIG. 2, the initial point of contact with the wallet switch 602 may be via the acquirer 606 (or another service provider, not shown) rather than directly from the merchant 604.

Another point worth noting is that the transaction may start, from the merchant's point of view, as a result of an interaction by a user/payment device 608 with a merchant device (not shown apart from block 604; the merchant device may be, e.g., an e-commerce server or a point of sale terminal). The above discussion of the user/payment device 212 in connection with the payment system 200 of FIG. 2 is generally applicable as well to the user/payment device 608 depicted in FIG. 6. Thus the description provided above in connection with FIG. 4 is also pertinent, as the user/payment device 608 may in many cases be embodied as a smartphone. From previous discussion it will further be understood that the user/payment device 608 may alternatively be a PC or other like computing device that accesses an e-commerce website via a browser. Additional discussion of such embodiments of the user/payment device 608 will occur hereinbelow in connection with FIG. 7.

In some embodiments of the user/payment device 608, particularly where it is a mobile device, the user/payment device may include a "wallet chooser" function represented by block 610 in FIG. 6. The wallet chooser function 610 may allow the user to select, for the current transaction, between a device-based "mobile wallet" (block 612), and a WSP-serviced (web-based) wallet, maintained at wallet server 614.

When the user selects the mobile wallet 612, it may provide access via a payment application 616 to a digitized card that has been provisioned to the user/payment device 608. In some embodiments, however, the provisioning of one or more cards to the user/payment device 608 may be virtual, and remotely supported via interactions (arrow marks 618 and 620) between the mobile wallet 612 and the wallet server 614.

Further, the wallet server 614 may incorporate device and/or user authentication functionality (block 622) which may in some embodiments resemble the authentication processes described above in connection with payment system 200 and FIG. 5. Moreover, either within the perimeter of the wallet server 614, or callable from the wallet server 614, there may be transaction cryptogram generation functionality, as represented in FIG. 6 by EMV server payment application block 624 and ACS block 626.

In terms of its hardware aspects, the wallet server 614 may conform to the hardware architecture illustrated in FIG. 3. Much or all of the discussion of software aspects of the wallet server 206 (FIG. 3) may also be applicable to the wallet server 614 of FIG. 6. In addition or alternatively, the wallet server 612 may be programmed by software applications/program instructions to provide functionality such as that described below in connection with FIGS. 8-10.

Moreover, either or both of the EMV server payment application block 624 and/or the ACS block 626 may be constituted by, e.g., separate server computer hardware, possibly having the same hardware architecture illustrated in FIG. 3, and suitably programmed with software applications/program instructions to provide functionality as described herein.

Figure 7:
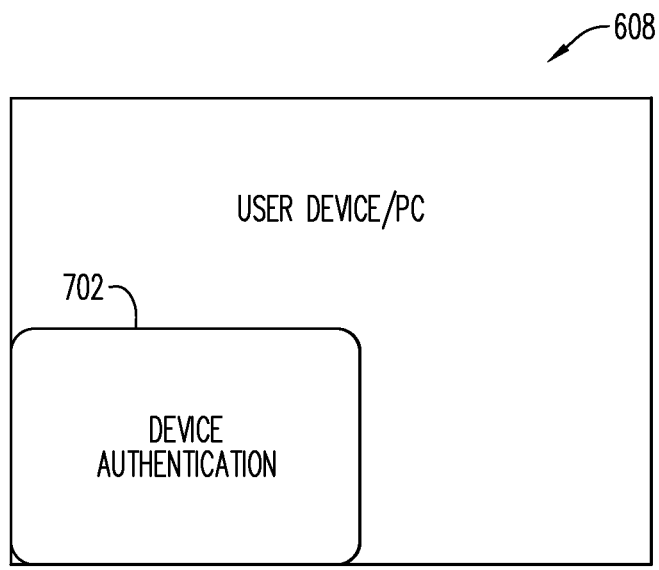
FIG. 7 is a schematic illustration of a user device that may be one element of the payment system of FIG. 6.

FIG. 7 is a schematic illustration of an alternative embodiment of the user/payment device 608 shown in FIG. 6. It is assumed in this instance that the user/payment device 608 is embodied as a conventional PC that runs a browser program and is used to engage in e-commerce transactions (e.g., online shopping). Those who are skilled in the art will recognize that the hardware aspects of the user/payment device embodiment shown in FIG. 7 may closely resemble the hardware architecture shown in FIG. 3. In addition, in FIG. 7, it is indicated by block 702 that device authentication functionality has been incorporated in this embodiment of the user/payment device 608. In some embodiments, for example, this may be implemented through one or more cookies cryptographically based on a device fingerprint.

Figure 8:
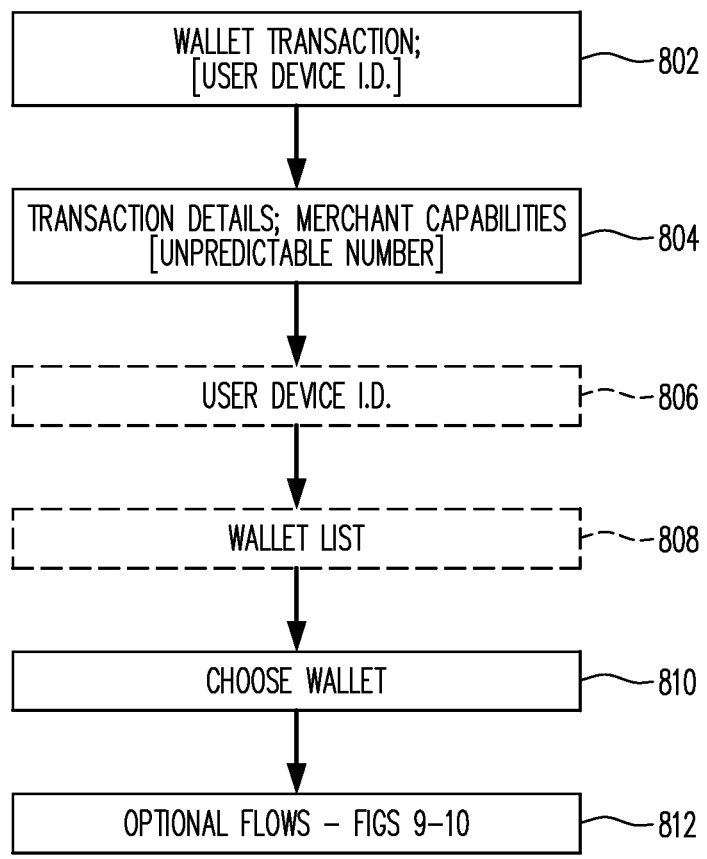
FIGS. 8-10 are high level flow charts that illustrate process flows that may be performed in the payment system of FIG. 6.
Figure 9:
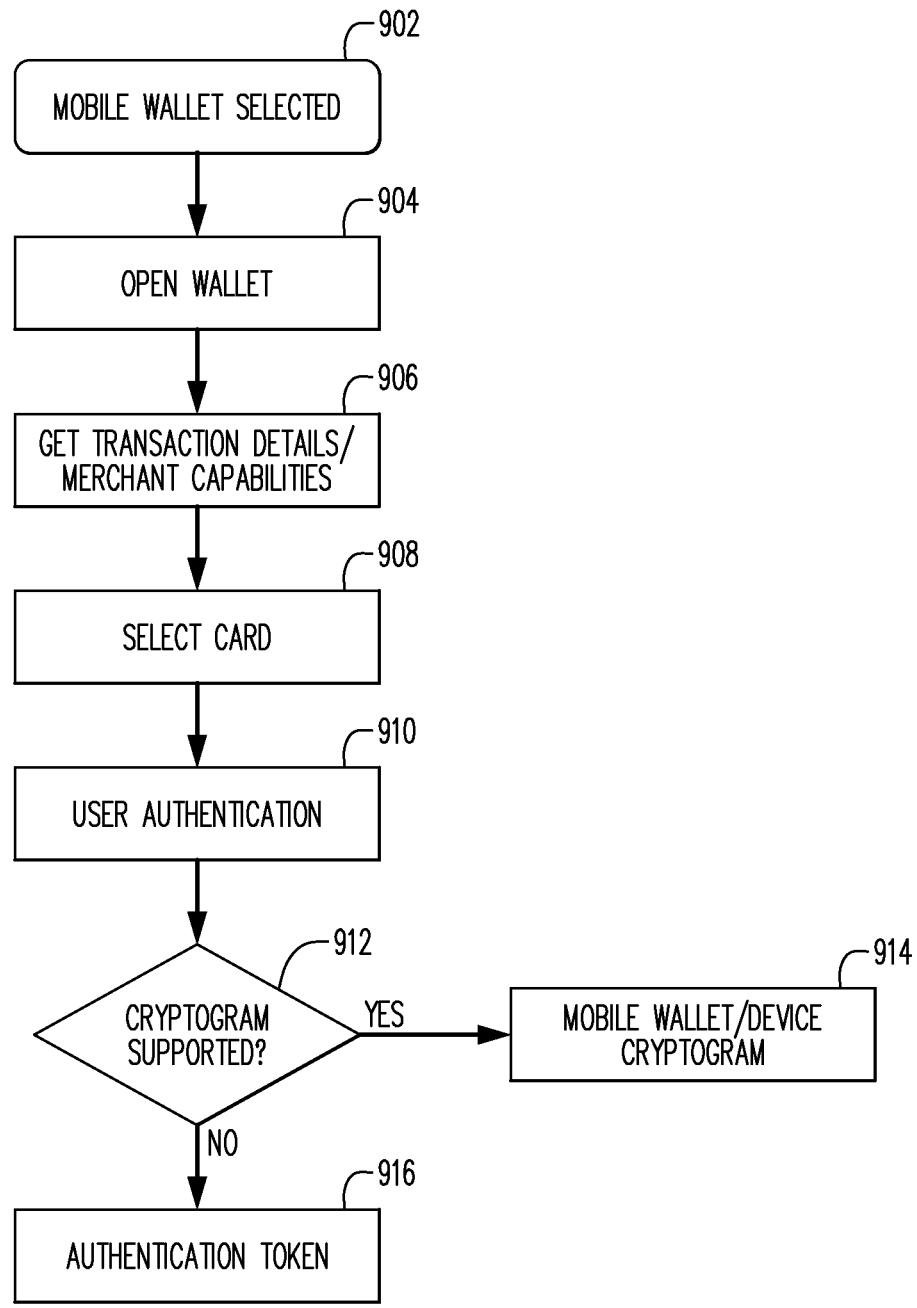
Figure 10:
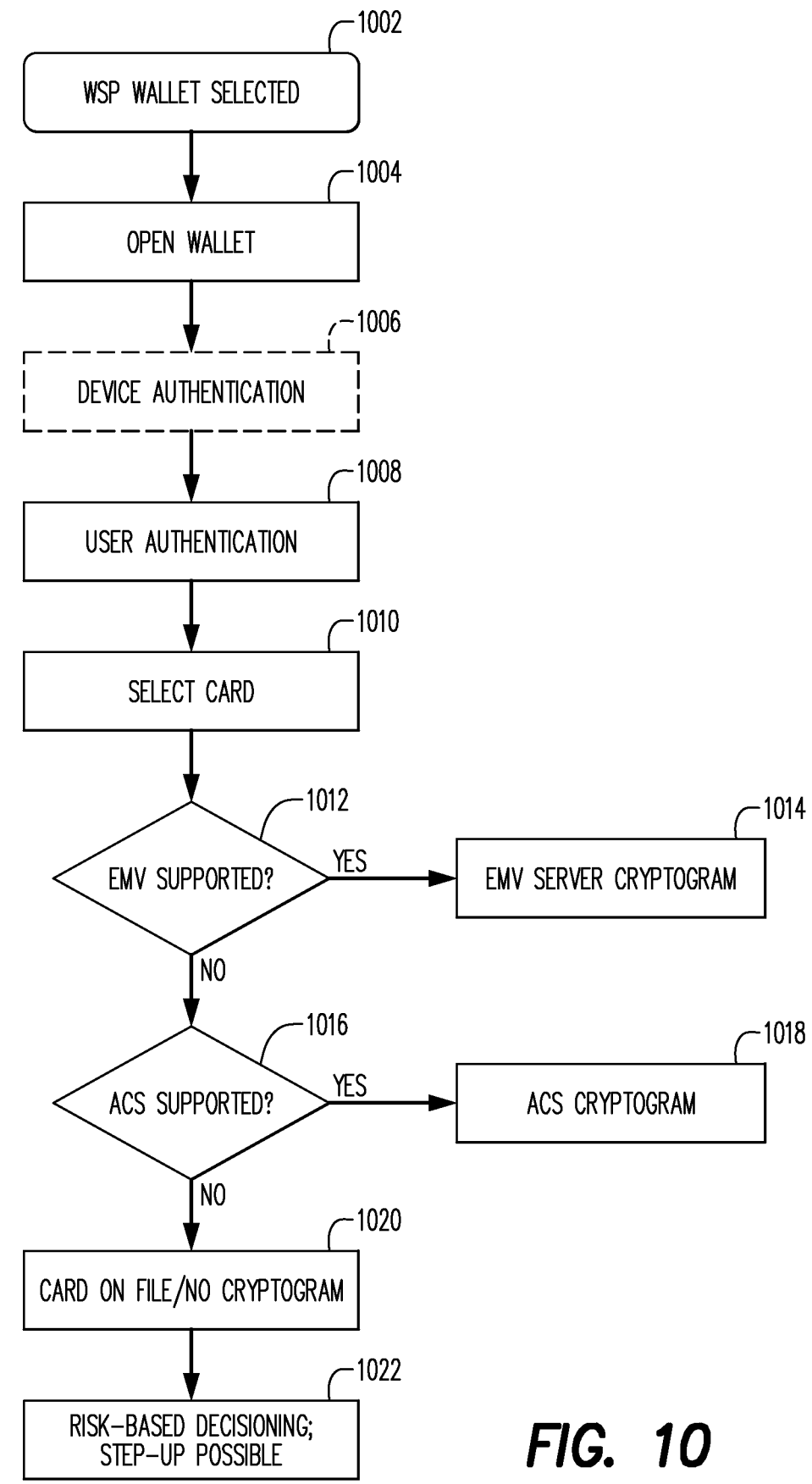

FIGS. 8-10 are high level flow charts that illustrate processes that may be performed in the payment system of FIG. 6.

Turning initially to FIG. 8, at 802 the merchant 604 may receive an indication from the user/payment device 608 that the user wishes to access a wallet that belongs to the user in order to effect payment for a current transaction. In some embodiments, the message from the user/payment device 608 to the merchant 604 may include a unique device identifier that identifies the user/payment device 608 and/or a wallet identifier that points to the wallet that is affiliated with the user.

In response, as indicated at 804 in FIG. 8, the merchant 604 may send a message to the wallet switch 602. The latter message may include, for example, transaction details (e.g., contents of a "checkout basket" in the case of a remote transaction), and also may include one or more indications of the capabilities of the merchant 604 vis-à-vis various modes of transaction security. These modes may include, for example, transaction security with cryptogram generation as per the EMV protocol and/or via ACS. In addition or alternatively, for example, the merchant's capabilities may include support for Digitally Secured Remote Payments (DSRP). As is familiar to those who are skilled in the art, DSRP may use a payment application on a cardholder's mobile device to generate an EMV-type cryptogram based on cardholder authentication to the payment application. The wallet server 614 may respond to the merchant 604 with an access token.

Optionally, as indicated at 806 in FIG. 8 (e.g., if the user/payment device 608 is a mobile device), the messaging from the merchant 604 to the wallet server 614 may include the device identifier for the user/payment device 608. The wallet server 614 may then return the corresponding list of available wallets to the merchant 604 (block 808, FIG. 8), which may then relay the wallet list to the user/payment device 608 to invoke the wallet chooser function 610 (FIG. 6) of the user/payment device 608. The user may then select a wallet (block 810, FIG. 8) from the wallet list. As indicated at block 812 in FIG. 8, the subsequent course of the transaction processing may vary depending on whether the user selects a mobile wallet (block 612, FIG. 6) or the user's WSP based wallet (stored on wallet server 614) for use in the current transaction.

FIG. 9 is a high level flow chart that illustrates a possible transaction flow in a case where the user selects (block 902) the mobile wallet 612.

At block 904, the mobile wallet may be opened, pursuant to a corresponding message (which may include the applicable access token) from the user device 608 to the mobile wallet function 612. Using the access token, the mobile wallet 612 may obtain the transaction details and the merchant security-related capabilities (block 906), via a sequence of messages that run from the mobile wallet 612 to the wallet server 614, to the wallet switch 602 and back from the wallet switch 602 to the mobile wallet 612 via the wallet server 614. The mobile wallet 612 may then display the transaction details to the user and receive the user's indication of which card the user selects from the mobile wallet for use in the current transaction (block 908). User authentication to the mobile wallet 612 may then take place (block 910). This may include, for example, entry of secret data such as a mobile wallet PIN, or biometric verification of the user's identity (e.g., fingerprint scan, facial recognition scan, voice recognition).

As indicated at decision block 912, the flow of FIG. 9 may branch, depending on whether the merchant security-related capabilities and the card account selected by the user both support a mobile-device generated cryptogram (e.g., both support DSRP). If such is the case, then the flow of FIG. 9 may branch from decision block 912 to block 914. At block 914, the mobile wallet 612 may send a request to the payment application 616 (i.e., to the payment application that corresponds to the selected card account) to have the payment application 616 generate a cryptogram over the transaction amount, an unpredictable number that was supplied by the merchant, and at least one aspect of the user authentication credentials received by the mobile wallet 612 at block 910. The payment application 616 then generates the cryptogram (e.g., in accordance with the standard practices for DSRP) and transmits the cryptogram to the mobile wallet 612. The mobile wallet then sends the cryptogram to the wallet server 614.

Referring again to decision block 912, if it is the case that either the merchant does not support a mobile device cryptogram or the card account selected does not support such a cryptogram, then the flow of FIG. 9 may branch from decision block 912 to block 916.

At block 916, the mobile wallet 612 generates an authentication token (i.e., an indication that authentication of the user to the mobile wallet 612 took place) and sends the resulting authentication token to the wallet server 614.

FIG. 10 is a high level flow chart that illustrates a possible transaction flow in a case where the user selects (block 1002) a wallet stored for the user on wallet server 614.

At block 1004, the WSP-maintained wallet is opened, pursuant to a request message from the user/payment device 608 to the wallet server 614. The wallet server 614 may respond to the opening of the wallet with a request to the user/payment device 608 for authentication of the device (block 1006) and/or the user (block 1008). The above extended discussion of blocks 504-508 of FIG. 5 is pertinent to blocks 1006 and 1008 in FIG. 10, and provides examples of how device and/or user authentication may be performed in the process of FIG. 10. It is noted that this authentication is to the wallet server 614. The process and ensuing parts of the flow may include the user entering credentials into the user/payment device 608 to permit the user/payment device 608 to generate an authentication response, which the user/payment device 608 sends to the wallet server 614 (specifically to the wallet authentication function 622 (FIG. 6)). Assuming that user authentication is successful, as determined by the wallet authentication function 622, selection of the card account may follow (block 1010), including messaging from the wallet server 614 to the wallet switch 602 (using the access token), to obtain the transaction details, and return of the transaction details from the wallet switch 602 to the wallet server 614. This may be followed by messaging from the wallet server 614 to the user/payment device 608 to provide the transaction details and to call for card selection, then input from the user to user/payment device 608 to indicate card selection. The indication of the card selection is then forwarded from the user/payment device 608 to the wallet server 614.

As indicated at decision block 1012, the flow of FIG. 10 may branch, depending on whether the merchant security-related capabilities and the card account selected by the user both support EMV emulation at the wallet server 614. If such is the case, then the flow of FIG. 10 may branch from decision block 1012 to block 1014. At block 1014, a cryptogram for the current transaction may be generated in accordance with practices defined by the EMV standard; the generation of the cryptogram may occur at the EMV server payment application 624. The above discussion of block 516 in FIG. 5 is pertinent to block 1014 and may provide an example of how block 1014 may be performed. The process block may include the wallet server 614, via the wallet authentication function 622, requesting of the EMV server payment application 624 that it generates a cryptogram over the transaction amount, an unpredictable number provided by the merchant 604 and an authentication status indicator (e.g., the latter may be a user authentication status flag value, as referred to above in connection with FIG. 5). The EMV server payment application 624 may then generate the requested cryptogram and return it to the wallet server 614.

Considering again decision block 1012, if it is not the case that both the merchant and the card account selected provide support for EMV emulation at the wallet server 614, then the flow of FIG. 10 may branch from decision block 1012 to decision block 1016. At decision block 1016, the flow of FIG. 10 may branch, depending on whether the merchant security-related capabilities and the card account selected by the user both support security measures associated with an ACS. If so, then the flow of FIG. 10 may advance from decision block 1016 to block 1018. At block 1018, the wallet server 614 may request that the access control server 626 (or similar functionality within the perimeter of the wallet server 614) generate a cryptogram for the transaction based on the transaction amount, the user authentication status as determined by the wallet server 614 and details of the selected card account. The access control server 626 may then generate the cryptogram, which may be of the type referred to as an "AAV" (Account Authentication Value). The generation of the AAV may, for example, conform to the MasterCard Secure Payment application specifications or other similar techniques.

After the access control server 626 provides the AAV to the wallet server 614, the latter may generate a card details structure based in part on the AAV.

Referring again to decision block 1016, if it is the case either that the merchant or the card selected does not support ACS-style security measures, then the flow of FIG. 10 may advance from decision block 1016 to block 1020. At block 1020, the wallet server 614 may generate card details without using a cryptogram (since no cryptogram has been generated in this path through the process flow). Accordingly, the output from the wallet server 614 may be in the nature of a conventional WSP card-on-file output, and may be followed by a conventional risk-based-decisioning process (block 1022). The latter process may, for example, be handled via the wallet server 614, and—depending on the results of the risk assessment—may lead to a conventional so-called "step up" process in which user authentication is handled by an issuer-related ACS (not shown).

It should be noted that where the process of FIGS. 8-10 results in the wallet server 614 receiving (or generating) a cryptogram for the transaction (via block 914 or block 1014 or block 1018, as the case may be), risk-based decisioning may be bypassed, and the wallet server 614 may transmit the card details, including the transaction cryptogram, to the merchant 604 via the wallet switch 602. The merchant in turn may transmit an authorization request to the acquirer 606 including the card details and the transaction cryptogram. The authorization request may then proceed in a conventional manner via the payment network (not shown in FIG. 6) to the card account issuer (not shown in FIG. 6). If all is in order with the selected account, a conventional authorization response approving the transaction may be routed back to the merchant 604 from the issuer, via the payment network and the acquirer 606.

In connection with the process of FIGS. 8-10, certain techniques were described by which the wallet server may authenticate the user. In accordance with one or more alternative embodiments, other wallet-server-managed authentication techniques may be used. For example, according to one technique, where the user/payment device is a PC or similar device (i.e., not a smartphone), the wallet server may send a one-time password to the user's mobile device (e.g., a smartphone registered to the user within the user's digital wallet in the wallet server). The user may then authenticate himself/herself to the wallet server by entering the one-time password back to the wallet server via the PC/user/payment device. Thus in such a situation a type of two-factor security may be implemented, in that the user has demonstrated access to two different devices associated with him/her in the wallet server's records, namely his/her PC and his/her mobile device.

In some embodiments, and/or in some instances—for example, where the user/payment device 608 is not a mobile device—the mobile wallet 612 and payment application 616 may not be present, and the process flow indicated in FIG. 9 may not be instantiated. Accordingly, where the user/payment device 608 is a PC or laptop computer or the like, the process flow of FIG. 10 may be instantiated.

With the embodiment of FIGS. 6-10, the user may again experience a streamlined manner of accessing accounts in his/her digital wallet, via authentication to the wallet server and emulation of one or more security schemes to the merchant/acquirer via the wallet server.

In some embodiments described herein, the benefits of digital wallets can be extended to payment card account holders without requiring provisioning of payment card account information to the account holders' mobile devices, and in a manner that minimizes the steps required of the account holder in executing a wallet-based transaction.

As used herein and in the appended claims, the term "e-commerce" refers to purchases via a merchant's online store, and/or "in-aisle" shopping/payment or any other transaction in which payment is made over the internet or via interaction by a mobile application with a remote server or other computer.

As used herein and in the appended claims, the term "authentication task" refers to a user entering a PIN or other secret information into a device or permitting biometric data to be gathered from the user.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices which represent clients submitting service requests.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account", "payment card account" and "primary account number" (PAN) are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
   maintaining a digital wallet in a computer, the digital wallet storing a plurality of payment account entries associated with a user of the digital wallet, each of said payment account entries corresponding to a respective payment account that belongs to said user;
   receiving a request for a transaction;
   receiving and verifying, by the computer, user authentication data regarding the user and the requested transaction;
   verifying, by the computer, authentication of a device used by the user to initiate the transaction, said verifying authentication of the device including verification of a hash result calculated over identification data stored in the device, said identification data including at least one serial number assigned to a hardware or software component of the device; and
   in response to verifying the user authentication data, allowing the user to access any one of said payment accounts without requiring further user authentication.

2. The method of claim 1, further comprising:
   setting a user authentication status flag to a "valid" state in the computer to indicate that the computer has verified the received user authentication data; wherein the computer does not receive a user authentication status flag value from said device used by the user.

3. The method of claim 1, wherein the device used by the user is a personal computer, a laptop computer, a tablet computer or a smartphone.

4. The method of claim 1, wherein the user is not required to perform more than one authentication task for the transaction.

5. The method of claim 1, wherein the user authentication data includes or is derived from a PIN (personal identification number) entered by the user.

6. The method of claim 1, wherein the user authentication data includes or is derived from biometric data generated by interaction with the user.

7. The method of claim 1, wherein the computer is operated by or on behalf of a wallet service provider.

8. A method comprising:
   maintaining a digital wallet in a server computer, the server computer operated by or on behalf of a wallet service provider, said server computer configured to store digital wallets for users supported by the wallet service provider, said server computer further configured to respond to service requests from client devices;
   receiving a request for a transaction using a payment account represented in the digital wallet;
   receiving and verifying, by the server computer, authentication data for the requested transaction; and
   in response to verifying the authentication data by the server computer, triggering by the server computer generation of a cryptogram for the transaction, said cryptogram generated in accordance with an EMV standard.

9. The method of claim 8, wherein the cryptogram is generated in the server computer.

10. The method of claim 8, wherein the server computer is a wallet services computer, said wallet services computer being a first server computer, and the cryptogram is generated in a second server computer that is in communication with the wallet services computer, said second server computer different from the first server computer.

11. The method of claim 8, wherein the transaction is an e-commerce transaction.

12. The method of claim 11, wherein:
    the verified authentication data includes user authentication data; and
    the user is not required to perform more than one authentication task for the transaction.

13. An apparatus comprising:
    a processor; and
    a memory in communication with said processor and storing program instructions, said processor operative with the program instructions to perform functions as follows:
    maintaining a digital wallet, the digital wallet storing a plurality of payment account entries associated with a user of the digital wallet, each of said payment account entries corresponding to a respective payment account that belongs to said user, the digital wallet stored in one of a plurality of partitions maintained in a server computer;
    receiving a request for a transaction;
    receiving and verifying user authentication data regarding the user and the requested transaction;
    verifying authentication of a device used by the user to initiate the transaction, said verifying authentication of the device including verifying a result computed by the device based in part on a challenge issued to the device by the server computer; and
    in response to verifying the user authentication data, allowing the user to access any one of said payment accounts without requiring further user authentication;
    wherein the processor is further operative with the program instructions to:
    set a consumer authentication status flag to a "valid" state to indicate that the processor has verified the received user authentication data; wherein the processor does not receive a consumer authentication status flag value from said device used by the user.

* * * * *